United States Patent Office 3,478,329

Patented Nov. 11, 1969

3,478,329

PROCESS FOR THE RECORDING AND REPRODUCING OF INFORMATION DATA ON RECORDING CARRIERS, AND RECORDING CARRIER THEREFOR

André Etienne de Rudnay, Chateau de Valency CH1000, Lausanne, Switzerland

No Drawing. Filed Oct. 13, 1965, Ser. No. 495,676
Int. Cl. G11c 7/00, 13/02
U.S. Cl. 340—173 7 Claims

ABSTRACT OF THE DISCLOSURE

A high density relatively permanent information recording carrier consisting essentially of a thin-layered solid body member having a surface of inorganic material (selected from the group consisting of Ti, Al, Pd, Pt, a high-melting rectifying-like metal and a material capable of adsorbing hydrogen and retaining it at room temperature), with selected regions thereof, chemically distinct from other regions thereof, the selective regions being ordered and arranged in accordance with the information and the selected regions differentially having predetermined chemical structure in relation to other intervening regions of the recorder surface and being capable of reliably differentially altering impinging electromagnetic radiation in a predetermined manner so that the entire surface can be systematically electromagnetically scanned to retrieve the stored information at the successive selected regions.

The present invention relates to a process for the recording (writing) of information data on recording carriers and reproducing (reading) of information data therefrom, in particular, recording carriers such as plates, for example, card formation or in the form of strips. As information data which are to be written on the recording carrier there come into consideration both so-called analog information data such as, for example, speech and music recording, analog measurement values, modulation signals etc., and also so-called digital information data in which there are recorded exclusively yes-no signals (bits). In particular, moreover, there is involved the provision of a lasting recording which normally cannot be erased, so that the process according to the invention is especially suited for use as so-called fixed-value storer (bit storer) for the recording of program tables etc. in computers. In such storers there exists a special demand for the accommodation of a great amount of information data on a surface unit. The recording carrier to be used according to the invention has, as will be explained in detail, a very high storage density and it is therefore especially suited for the purposes mentioned.

The new process for recording and reproducing is characterized by the feature that as a recording carrier there is used an inorganic solid body, in particular an inorganic solid thin layer, the surface of which is arranged as part of an optical interference system with a closely bundled light or electron beam (i.e. concentrated electromagnetic radiation) for local activating and/or scanning of the chemical quality and which is exposed to or is withdrawn from the action of reactive gases or of their ions for the recording thereof.

The following considerations are basic to the process according to the invention.

If the chemical nature of an inorganic solid body surface or thin layer undergoes a change in consequence of reaction with reactive gases or the ions of such gases, this change can then, in most cases, also be ascertained with the aid of beams of electromagnetic waves or charged particles, and, for example, be measured. Especially exact measurements are made possible in those cases in which the surface, for example, the thin layer, forms a component of an optical interference system. Thus, for example, the thickness of an oxide layer that has been formed on a high-melting metal exhibiting a rectifying effect and which forms interference colors can be determined very precisely, while a slight change of the chemical nature of a partially-permeable thin metal layer which, for example has occurred through absorption of hydrogen, nitrogen, oxygen, a halogen or of another reactive gas or gas compound, also causes a modification of the optical permeability to light, band width, or displacement of the spectrum passed by a Fabry-Perot interference filter. The reflection of a Hadley-Dennison interference system can be increased by the method that the electrical resistance of the partially-permeable upper thin layer originally set for 377 ohm/square, is raised or lowered by hydrogenation nitrogenation etc. The measuring of these physical changes can be accomplished with a beam bundle of only 1 micron in diameter or less, so that changes in extremely small interference systems or extremely small portions of larger interference systems can be detected in this way.

It is further a known practice, to bring a very small area or a very small part of an area of a solid body into chemical reaction with a reactive gas or such a gas compound by means of concentrated light beams or beams of charged particles.

In the process according to the invention both possibilities (alteration of small areas or parts of areas of an optical interference system by means of reactive gases or ions of such gases and measurement of the changes generated with the aid of bundled beams) are combined into a new writing and reading process which permits the production of extremely compact, well-modulated and legible inscriptions characterized by excellent chemical and physical properties. In particular, surfaces, inscribed by the process of the invention, can be produced which endure temperatures of several hundred degrees centigrade, are not attacked by any organic and only by few inorganic solvents, do not magnetically transfer the recorded information, make it possible to continuously store the information even with frequent reading in its full extent and without increase of the interference level and, finally, make possible a writing (signal) density which considerably exceeds the photomechanical writing densities limited by grain size.

The new process is explained in detail with the aid of the following examples:

(1) A plate of glass or ceramic material or another suitable carrier is vapor treated in high vacuum with a layer about 1 micron thick of finest-crystalline titanium and thereupon provided, by thermal oxidizing, with a layer of grown $TiO_2$ about 300 angstroms thick, which reflects less than 1% of a blue beam of light. The grown oxide layer is subsequently supplemented in the places to be inscribed by means of a light beam concentrated to several microns in diameter, or an electron or ion beam, or several such beams in the presence of oxygen or oxygen gas residues, up to 700 angstroms, so that the thickness of the grown oxide layer fluctuates between 300 and 700 angstroms, corresponding to a reflection of a beam of blue light of less than 1% to 65%. The reflection characteristics of the plate, produced in this manner in the form of fine tracks, constantly changing, can be measured with a blue light beam of 1 micron in diameter and a photodiode and recorded or otherwise utilized as information. The inscribed plate is heat-resistant up to 400° C., is not attacked by any organic solvent and only by few inorganic solvents, can be stacked closely with other inscribed carriers, without transferring its own inscription to other carriers or itself taking over alien information data, can be read as often as desired without loss of quality or strength of the reproduction and has a script density which heretofore has not been possible to achieve with other means.

(2) A band consisting of a fine-grained rectifying-like metal, such as, for example, rolled or vaporized-on aluminum, titanium etc. is provided by means of modulated laser beams with an oxide layer yielding interference colors, of various thickness in narrow tracks, and the variation of the coating thickness corresponding to the recorded information may be measured with the aid of an ion beam generated by means of radioactive tritium. In order to impart to the band an increased mechanical strength it is preferably reinforced (lined) with a suitable plastic foil, or embedded between two plastic sheets of good transparency, if the reading is to be done by means of light beams instead of charged particles. Such a band can be stored or read without loss or impairment of the information and its production cost calculated for the storable amount of information is considerably lower than that of magnetic tapes and photographic films.

(3) Oxide layers of a rectifying-like metal or other element or a compound yielding interference effects are etched, in the presence of an etching gas with bundled beams of charged particles, to various depths in part or entirely. The layer thickness change thus achieved is measured according to Examples 1 and 2 and evaluated as information.

(4) The partially-transparent layer, consisting of titanium, of a Hadley-Dennison interference filter, whose reflection in green light lies below 1%, is heated in the presence of nitrogen gas residues with a bundled beam of charged particles at desired places, whereby such places undergo a more or less deep, wide nitration which is variable in its chemical composition. Through nitration the original resistance of the partial-transparent titanium layer is lowered in selected places from about 377 ohm/square to less than half the original resistance, while the reflection of the originally reflection-poor filter is simultaneously increased. The variable reflection of a thus inscribed filter is read with a green light beam and a photoelectric cell.

(5) The upper layer, consisting of a metal of the platinum group, such as palladium or platinum, or a high-melting rectifying-like metal or another metal or compound absorbing hydrogen and retaining it at room temperature, of a Fabry-Perot interference filter is hydrogenated by bombardment with charged particles in the presence of hydrogen gas residues or in another manner in the form of fine tracks, in which process through variation of the current strength, acceleration voltage and duration of the bombardment, places or tracks of differing depth, width and chemical composition are generated. In this manner the reflection and the light permeability of the uppermost layer, as well as the phase shift on its inner side, are continuously altered, whereby the middle band width of the interference filter, its permeability, reflection, as well as the middle wavelength of the passed spectrum are likewise altered. One or more of the changes thus achieved of the optical properties of the filter may be measured, for example, read, with the aid of monochromatic or white beam bundles utilizing inspection or reflection processes.

Changes may be made within the scope and spirit of the appended claims which define what is believed to be new and desired to have protected by Letters Patent.

I claim:

1. An information recording carrier consisting essentially of a thin-layered solid body member of an inorganic material capable of reacting with a gaseous substance, with selected regions thereof chemically distinct from other regions thereof, said selected regions being ordered and arranged in accordance with the information, said selected regions having predetermined differential chemical structure in relation to other intervening regions of the carrier surface caused by a gaseous substance and being capable of reliably differentially altering impinging electromagnetic radiation in a predetermined manner, so that the entire surface can be systematically electromagnetically scanned to retrieve this stored information at the successive regions.

2. A recording carrier as defined in claim 1, wherein the surface of the inorganic material comprises layers of differing chemical compositions.

3. A recording carrier as defined in claim 1, wherein the chemical nature of the selected regions varies as to depth and width in accordance with the information.

4. A recording carrier as defined in claim 1, wherein the surface of an inorganic material is a titanium layer having a thickness of approximately 1 micron and the selected regions thereof which are chemically distinct from other regions thereof comprise a layer of titanium oxide of about 300 angstroms thick.

5. A recording carrier as defined in claim 1, wherein the inorganic material is selected from the group consisting of titanium, aluminum, palladium, platinum, a high-melting rectifying-like metal and a material capable of adsorbing hydrogen and retaining it at room temperature.

6. In a device for recording and reproducing informational data, the combination comprising, a thin-layered solid body member of an inorganic material capable of reacting with a gaseous substance, with selected regions thereof chemically distinct from other regions thereof, said selected regions being ordered and arranged in accordance with the information, said selected regions having predetermined different chemical structure caused by a gaseous substance in relation to other intervening regions of the carrier structure and being capable of reliably differentially altering impinging electromagnetic radiation in a predetermined manner so that the entire surface can be systematically electromagnetically scanned to retrieve the stored information at the successive select regions and an electromagnetic scanning system having concentrated beams of electromagnetic radiation detecting localized alterations in the chemical nature of the surface of said carrier and translating such localized alterations into useful information.

7. A process of recording and reproducing informational data on and from an inorganic thin-layered solid body recording carrier capable of reacting with a gaseous substance comprising selectively exposing said carrier to a reactive gas, allowing the addition of a gaseous component onto the surface of said carrier in accordance with the informational data, and positioning said exposed carrier in working relationship with an electromagnetic scanning system having concentrated beams of energy detecting localized alterations in a chemical nature of the surface of said carrier.

References Cited

UNITED STATES PATENTS 3,423,740 1/1969 Barrekette ---------- 340—173

TERREL W. FEARS, Primary Examiner

U.S. Cl. X.R.

346—1, 76